US011993739B2

(12) United States Patent
Shinohara et al.

(10) Patent No.: US 11,993,739 B2
(45) Date of Patent: May 28, 2024

(54) NITRIDE PHOSPHOR AND METHOD FOR PRODUCING SAME

(71) Applicant: NICHIA CORPORATION, Anan (JP)

(72) Inventors: Takayuki Shinohara, Anan (JP); Shimpei Kinoshita, Anan (JP)

(73) Assignee: NICHIA CORPORATION, Anan (JP)

( * ) Notice: Subject to any disclaimer, the term of this patent is extended or adjusted under 35 U.S.C. 154(b) by 8 days.

(21) Appl. No.: 17/657,111

(22) Filed: Mar. 29, 2022

(65) Prior Publication Data

US 2022/0315837 A1 Oct. 6, 2022

(30) Foreign Application Priority Data

Mar. 30, 2021 (JP) .................................. 2021-057955
Nov. 16, 2021 (JP) .................................. 2021-186227

(51) Int. Cl.
*C09K 11/77* (2006.01)
*C01B 21/06* (2006.01)

(52) U.S. Cl.
CPC .... *C09K 11/77218* (2021.01); *C01B 21/0602* (2013.01); *C01P 2002/54* (2013.01); *C01P 2002/60* (2013.01); *C01P 2004/03* (2013.01)

(58) Field of Classification Search
CPC .................. C09K 11/77218; C09K 11/77348
See application file for complete search history.

(56) References Cited

U.S. PATENT DOCUMENTS

| 2006/0033083 A1* | 2/2006 | Sakane .................. H05B 33/14 |
| | | 252/301.4 F |
| 2007/0007494 A1 | 1/2007 | Hirosaki et al. |
| 2009/0066230 A1* | 3/2009 | Hirosaki ............. C04B 35/6262 |
| | | 313/504 |
| 2012/0019127 A1 | 1/2012 | Hirosaki |
| 2013/0207146 A1 | 8/2013 | Yoshimura et al. |
| 2015/0184070 A1* | 7/2015 | Kim .................... C09K 11/0883 |
| | | 252/301.4 F |
| 2019/0177607 A1 | 6/2019 | Murazaki |
| 2020/0002605 A1 | 1/2020 | Morikawa et al. |

FOREIGN PATENT DOCUMENTS

| JP | 2006008721 A | 1/2006 |
| JP | 2013170177 A | 9/2013 |
| JP | 2013173868 A | 9/2013 |
| JP | 2019099780 A | 6/2019 |
| JP | 2020002245 A | 1/2020 |
| JP | 2020083945 A | 6/2020 |
| WO | 2010110457 A1 | 9/2010 |
| WO | 2012014702 A1 | 2/2012 |

* cited by examiner

*Primary Examiner* — Matthew E. Hoban
(74) *Attorney, Agent, or Firm* — Hunton Andrews Kurth LLP

(57) ABSTRACT

Provided a method for producing a nitride phosphor. The method includes preparing a mixture that comprises a first nitride and a cerium source, the first nitride comprising, as a host crystal, a crystal having the same crystal structure as $CaAlSiN_3$; and performing a heat treatment of the mixture at a temperature of 1,300° C. to 1,900° C. to obtain a second nitride. The first nitride comprises aluminum, silicon, nitrogen, and at least one selected from the group consisting of lithium, calcium, and strontium.

12 Claims, 5 Drawing Sheets

NITRIDE PHOSPHOR AND METHOD FOR PRODUCING SAME

CROSS-REFERENCE TO RELATED APPLICATIONS

This application claims priority to Japanese Patent Application No. 2021-057955, filed on Mar. 30, 2021, and Japanese Patent Application No. 2021-186227, filed on Nov. 16, 2021, the disclosures of which are hereby incorporated by reference in their entireties.

BACKGROUND

Field of the Invention

The present disclosure relates to a nitride phosphor and a method for producing the same.

Description of the Related Art

For example, in image projection devices (projectors) that display color images by projecting light emitted from a light source device onto a screen using a micromirror display element or the like, there is a demand for improvement in the output of the light source device. In conjunction with this, a phosphor used in the light source device is demanded to have high output characteristics.

For example, WO2010/110457 describes a phosphor that contains Li, Ca, Si, Al, O, N, and Ce and has a $CaAlSiN_3$ crystal as a host crystal, and this phosphor is described to have a high emission efficiency and emit light with a high brightness.

SUMMARY

A method for producing a nitride phosphor according to a first embodiment includes: preparing a mixture that contains a first nitride and a cerium source, the first nitride containing, as a host crystal, a crystal having the same crystal structure as $CaAlSiN_3$; and performing a heat treatment of the mixture at a temperature of 1,300° C. to 1,900° C. to obtain a second nitride, and the first nitride includes aluminum, silicon, nitrogen, and at least one selected from the group consisting of lithium, calcium, and strontium.

A nitride phosphor according to a second embodiment includes aluminum, silicon, nitrogen, cerium, and at least one selected from the group consisting of lithium, calcium, and strontium, and has a cerium molar content of more than 0.006 when an aluminum molar content is 0.6. The nitride phosphor contains, as a host crystal, a crystal having the same crystal structure as $CaAlSiN_3$, and has a crystallite size of 70 nm or smaller as determined from an X-ray diffraction pattern.

DETAILED DESCRIPTION

Figure 1A:
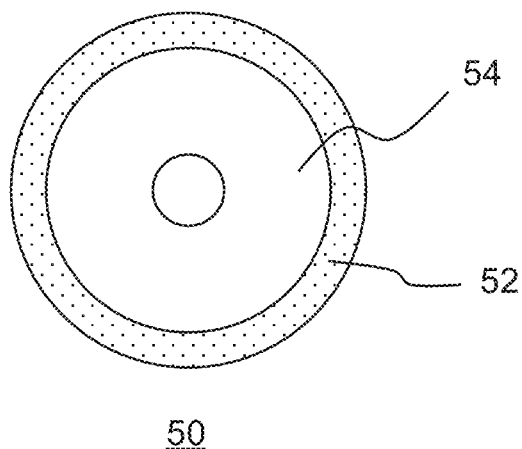
FIG. 1A is a plan view of an exemplary wavelength conversion member taken from a main surface side.

The term "step" used herein encompasses not only a discrete step but also a step that cannot be clearly distinguished from other steps, as long as the intended purpose of the step is achieved. When there are plural substances that correspond to a component of a composition, an indicated amount of the component contained in the composition means, unless otherwise specified, a total amount of the plural substances existing in the composition. Further, upper limit and lower limit values described for a numerical range in the present specification can be selected and combined arbitrarily. Embodiments of the present invention will now be described in detail. It is noted here, however, that the below-described embodiments are merely examples of a method for producing a nitride phosphor that embodies the technical idea of the present invention, and the present invention is not limited to the below-described method for producing a nitride phosphor.

Method for Producing Nitride Phosphor

The method for producing a nitride phosphor includes: a providing step of providing a mixture that contains a first nitride and a cerium source and a heat treatment step of performing a heat treatment of the thus prepared mixture at a temperature of 1,300° C. to 1,900° C. to obtain a second nitride. The first nitride contains, as a host crystal, a crystal having the same crystal structure as $CaAlSiN_3$. The first nitride includes aluminum, silicon, nitrogen, and at least one selected from the group consisting of lithium, calcium, and strontium.

By heat-treating the first nitride containing as a host crystal a crystal having the same crystal structure as $CaAlSiN_3$ together with the cerium source, a nitride phosphor in which the cerium content ratio in the composition is increased particularly in the vicinity of the surface is obtained. The resulting nitride phosphor can exhibit an emission intensity corresponding to an excitation energy even when it is excited by a high energy. This is seemingly partly because, in a case of obtaining a nitride phosphor by introducing cerium, which is an activator, to the first nitride later in the heat treatment step, the cerium content is likely to be higher in the vicinity of the surfaces of the resulting nitride phosphor particles and absorption of excitation light by cerium in the vicinity of the surface is thus increased as compared to, for example, a case of obtaining a nitride phosphor having an increased cerium content ratio.

In the providing step, a mixture containing a first nitride and a cerium source is provided. This mixture can be obtained by weighing the first nitride and the cerium source such that a desired mixing ratio is obtained, and subsequently mixing them by, for example, a mixing method using a ball mill or the like, a mixing method using a mixing machine such as a Henschel mixer or a V-type blender, or a mixing method using a mortar and a pestle. The mixing may be dry-mixing, or wet-mixing with an addition of a solvent and the like.

The first nitride includes aluminum (Al), silicon (Si), nitrogen (N), at least one element selected from the group consisting of lithium (Li), calcium (Ca), and strontium (Sr), and may further include cerium (Ce). The first nitride contains as a host crystal a crystal having the same crystal structure as $CaAlSiN_3$. The phrase "contain as a host crystal a crystal having the same crystal structure as $CaAlSiN_3$" used herein means that the first nitride contains, as its host crystal, a $CaAlSiN_3$ crystal or a crystal having a crystal structure identical with that of $CaAlSiN_3$. With regard to the details of the $CaAlSiN_3$ crystal, reference can be made to, for example, Japanese Laid-Open Patent Publication No. 2006-008721. Examples of the crystal having a crystal structure identical with that of $CaAlSiN_3$ include a $LiSi_2N_3$ crystal, a $Si_2N_2O$ crystal, a $SrAlSiN_3$ crystal, a $NaSi_2N_3$ crystal, and solid solution crystals of these crystals.

The first nitride may be, for example, a phosphor that absorbs light of 320 nm or higher and 500 nm or lower and has an emission peak in a wavelength range of 550 nm or higher and 620 nm or lower. A maximum excitation wavelength of the first nitride may be preferably in a wavelength range of 420 nm or higher and 480 nm or lower. Further, the first nitride may have an emission peak in a wavelength range of 570 nm or higher and 600 nm or lower.

In the composition of the first nitride, when N is 3, a Li content ratio may be, for example, 0 or higher but lower than 1, and it is preferably 0.2 or higher and 0.6 or lower, or 0.3 or higher and 0.5 or lower. In addition, in the composition of the first nitride, when N is 3, a total content ratio of Ca and Sr may be, for example, higher than 0 but 1 or lower, and it is preferably 0.4 or higher and 0.8 or lower, or 0.5 or higher and 0.7 or lower. Further, in the composition of the first nitride, when N is 3, a Si content ratio may be, for example, 1 or higher and 2 or lower, and it is preferably 1.1 or higher and 1.7 or lower, or 1.3 or higher and 1.5 or lower. Moreover, in the composition of the first nitride, when N is 3, an Al content ratio may be, for example, 0 or higher and 1 or lower, and it is preferably 0.4 or higher and 0.8 or lower, or 0.5 or higher and 0.7 or lower. The composition of the first nitride may further include Ce. In the first nitride, when N is 3, a Ce content ratio may be, for example, 0 or higher and 0.1 or lower, and it is preferably 0.001 or higher 0.02 or lower, or 0.004 or higher and 0.01 or lower.

The first nitride may also be a solid solution composed of: a third nitride that contains as a host crystal a crystal having the same crystal structure as $CaAlSiN_3$, and Li, Si, and N; and a fourth nitride that contains as a host crystal a crystal having the same crystal structure as $CaAlSiN_3$, and at least either element of Ca and Sr, Al, Si, and N. In the composition of the first nitride, Li, Ca, and Sr may be partially substituted with Ce. The third nitride may have a composition represented by, for example, $LiSi_2N_3$. Further, the fourth nitride may have a composition represented by (Ca, Sr)$AlSiN_3$. In other words, the first nitride may have a composition represented by the following Formula (1):

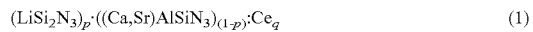

$$(LiSi_2N_3)_p \cdot ((Ca,Sr)AlSiN_3)_{(1-p)} \cdot Ce_q \qquad (1)$$

In Formula (1), p and q satisfy $0 \leq p < 1$ and $0 \leq q \leq 0.1$. Preferably, p may be $0.2 \leq p \leq 0.6$ or $0.3 \leq p \leq 0.5$, and q may be $0 < q \leq 0.1$, $0.001 \leq q \leq 0.02$, or $0.004 \leq q \leq 0.01$.

The composition of the first nitride can be analyzed by, for example, inductively-coupled plasma (ICP) emission spectroscopy. The nitrogen content in the composition of the first nitride can be analyzed using an oxygen-nitrogen analyzer.

The volume-average particle size of the first nitride may be, for example, 1 μm or higher and 50 μm or lower, and it is preferably 10 μm or higher and 40 μm or lower, or 20 μm or higher and 30 μm or lower. The term "volume-average particle size" used herein means a particle size that corresponds to a cumulative volume of 50% from the small diameter side in a volume-based particle size distribution. The particle size distribution of the phosphor is measured using a particle size distribution analyzer in accordance with a pore electrical resistance method (electrical sensing zone method) based on the Coulter principle.

The first nitride contained in the mixture that contains the first nitride and the cerium source may be purchased, or prepared to have a desired composition. A method for preparing the first nitride will be described below.

The cerium source may be, for example, a cerium-containing compound, simple cerium, a cerium-containing alloy, or at least one selected from the group consisting of these materials. Examples of the cerium-containing compound include oxides, halides (e.g., fluoride and chloride), nitrides, hydrides, amide compounds, and imide compounds, compounds that can yield cerium nitride when heat-treated, alloys, or the like, and the cerium source may contain at least one selected from the group consisting of these cerium-containing compounds. Specific examples of the cerium-containing compound include cerium oxide, cerium nitride, cerium fluoride, cerium hydride, and cerium amide, and the cerium source may contain at least one selected from the group consisting of these compounds, preferably at least one selected from the group consisting of cerium oxide, cerium nitride, and cerium fluoride, more preferably at least cerium oxide. The cerium source may be used singly, or two or more thereof may be used in combination.

The purity of the cerium source may be, for example, 95% by mass or higher, and it is preferably 99.5% by mass or higher. By controlling the purity to be a prescribed value or higher, the effects of impurities are reduced, so that the emission intensity of the phosphor can be further improved.

The cerium source content in the mixture that contains the first nitride and the cerium source with respect to the first nitride may be, for example, 0.1% by mass or higher and 10% by mass or lower, and it is preferably 0.2% by mass or higher, or 0.3% by mass or higher, and preferably 5% by mass or lower, or 1% by mass or lower.

In the heat treatment step, a second nitride is obtained by heat-treating the thus provided mixture that contains the first nitride and the cerium source at a prescribed temperature. The second nitride obtained in the heat treatment step may contain the desired nitride phosphor. The heat treatment temperature in the heat treatment step is, for example, 1,300° C. or higher and 1,900° C. or lower, and it may be preferably 1,400° C. or higher, or 1,500° C. or higher, but preferably 1,700° C. or lower, or 1,600° C. or lower.

The heat treatment may include heating the mixture that contains the first nitride and the cerium source up to a prescribed heat treatment temperature, maintaining the heat treatment temperature, and cooling the mixture from the heat treatment temperature. The heating rate to the heat treatment temperature may be, for example, in terms of the heating rate from room temperature, 0.1° C./min or higher and 20° C./min or lower, preferably 0.5° C./min or higher, or 1° C./min or higher, and preferably 15° C./min or lower, or 10° C./min or lower. The heat treatment time in which the heat treatment temperature is maintained may be, for example, 0.5 hours or longer and 10 hours or shorter, preferably 1 hour or longer, or 2 hours or longer, and preferably 5 hours or shorter, or 4 hours or shorter. The cooling rate from the heat treatment temperature may be, for example, in terms of the cooling rate to room temperature, 1° C./min or higher and 600° C./min or lower.

The atmosphere used in the heat treatment step may be, for example, a nitrogen-containing atmosphere. The nitrogen-containing atmosphere may have a nitrogen content of, for example, 90% by volume or more, preferably 95% by volume or more, or 98% by volume or more, and the nitrogen-containing atmosphere may be substantially a nitrogen atmosphere ($N_2$ gas=100% by volume). The phrase "substantially a nitrogen atmosphere" used herein does not mean to exclude the presence of a gas other than nitrogen that is unavoidably incorporated. The content of such a gas other than nitrogen may be, for example, 1% by volume or less.

The pressure of the atmosphere in the heat treatment step may be, in terms of the gauge pressure, 0.1 MPa or higher and 200 MPa or lower, preferably 0.3 MPa or higher, or 0.6 MPa or higher, and preferably 10 MPa or lower, or 1.2 MPa or lower.

The heat treatment of the mixture can be performed using, for example, a gas-pressurized electric furnace. The heat treatment of the mixture can be performed, for example, with the mixture being loaded to a crucible, a boat or the like that is made of a carbon material such as graphite, or a boron nitride (BN) material. Other than a carbon material and a boron nitride material, for example, alumina ($Al_2O_3$) or a molybdenum (Mo) material can be used as well. Thereamong, it is preferred to use a crucible or a boat that is made of a boron nitride material.

The second nitride obtained in the heat treatment step may be subjected to treatments such as pulverization, dispersion, washing, filtration, and classification. The washing can be performed by, for example, dispersing the second nitride in water and subsequently solid-liquid separating the resultant. This solid-liquid separation can be performed by a method that is industrially generally employed, such as filtration, suction filtration, pressure filtration, centrifugation, or decantation. In addition, the second nitride may be treated with an acid. This acid treatment can be performed by, for example, dispersing the second nitride in an acidic aqueous solution and subsequently solid-liquid separating the resultant. The acid treatment may be followed by washing with water and solid-liquid separation. For the acid treatment, an inorganic acid such as hydrochloric acid, sulfuric acid, nitric acid, or hydrofluoric acid, or an organic acid such as acetic acid or oxalic acid can be used. Further, a drying treatment may be performed after the solid-liquid separation. The drying treatment can be performed using an apparatus that is industrially generally employed, such as a vacuum dryer, a hot-air heating dryer, a conical dryer, or a rotary evaporator.

Method for Preparing the First Nitride

The first nitride contained in the mixture may be prepared to have a desired composition. In other words, the providing step may include preparing a desired first nitride. For example, the first nitride can be prepared as follows.

A method for preparing the first nitride may include heat-treating a raw material mixture in a nitrogen gas-containing atmosphere at a temperature of 1,200° C. or higher and 2,000° C. or lower, which raw material mixture may contain an aluminum source, and a silicon source, and at least one selected from the group consisting of a lithium source, a calcium source, and a strontium source, and may further contain a cerium source as required.

The lithium source may be, for example, a lithium compound, simple lithium, or a lithium alloy. Examples of the lithium compound include: lithium-containing oxides, hydroxides, nitrides, oxynitrides, halides (e.g., fluoride and chloride), hydrides, amide compounds, and imide compounds; and compounds that can yield lithium nitride or the like when heat-treated, and the lithium source may contain at least one selected from the group consisting of these lithium compounds. Specific examples of the lithium compound include lithium nitride, lithium amide, lithium hydride, and lithium fluoride, and the lithium source may contain at least one selected from the group consisting of these lithium compounds, and preferably contains at least one of lithium nitride and lithium amide. The lithium source may be used singly, or two or more thereof may be used in combination.

The lithium source (e.g., lithium compound) has a purity of, for example, 95% by mass or higher, preferably 99.5% by mass or higher. By controlling the purity to be a prescribed value or higher, the effects of impurities are reduced, so that the emission intensity of the phosphor can be further improved.

In the raw material mixture, lithium of the lithium source may be partially substituted with other alkali metal. Examples of this other alkali metal include sodium and potassium. When the lithium source contains other alkali metal, the content thereof with respect to lithium may be, for example, 10% by mole or less, and it is preferably 5% by mole or less. A lower limit of the content is, for example, 1% by mole or more.

The calcium source is, for example, a calcium compound, simple calcium, or a calcium alloy. Examples of the calcium compound include: calcium-containing oxides, hydroxides, nitrides, oxynitrides, halides (e.g., fluoride and chloride), hydrides, amide compounds, and imide compounds; and compounds that can yield calcium nitride or the like when heat-treated, and the calcium source may contain at least one selected from the group consisting of these calcium compounds. Specific examples of the calcium compound include calcium nitride, calcium fluoride, calcium hydride, and calcium amide, and the calcium source may contain at least one selected from the group consisting of these calcium compounds, and preferably contains at least one of calcium nitride and calcium fluoride. The calcium source may be used singly, or two or more thereof may be used in combination. When two calcium sources are used in combination, the ratio thereof may be, for example, 10:0.01 to 9:1 based on mass.

The calcium source (e.g., calcium compound) has a purity of, for example, 95% by mass or higher, preferably 99.5% by mass or higher. By controlling the purity to be a prescribed value or higher, the effects of impurities are reduced, so that the emission intensity of the phosphor can be further improved.

The strontium source is, for example, a strontium compound, simple strontium, or a strontium alloy. Examples of the strontium compound include: strontium-containing oxides, hydroxides, nitrides, oxynitrides, halides (e.g., fluoride and chloride), hydrides, amide compounds, and imide compounds; and compounds that can yield strontium nitride or the like when heat-treated, and the strontium source may contain at least one selected from the group consisting of these strontium compounds. Specific examples of the strontium compound include strontium nitride, strontium fluoride, strontium hydride, and strontium amide, and the strontium source may contain at least one selected from the group consisting of these strontium compounds, and preferably contains at least one of strontium nitride and strontium fluoride. The strontium source may be used singly, or two or more thereof may be used in combination. When two strontium sources are used in combination, the ratio thereof may be, for example, 10:0.01 to 9:1 based on mass.

The strontium source (e.g., strontium compound) has a purity of, for example, 95% by mass or higher, preferably 99.5% by mass or higher. By controlling the purity to be a prescribed value or higher, the effects of impurities are reduced, so that the emission intensity of the phosphor can be further improved.

In the raw material mixture, calcium of the calcium source or strontium of the strontium source may be partially substituted with other Group II metal. Examples of this other Group II metal include magnesium and barium. When the calcium source or the strontium source contains other Group II metal, the content thereof with respect to a total amount of calcium and strontium may be, for example, 10% by mole or less, and it is preferably 5% by mole or less. A lower limit of the content is, for example, 1% by mole or more.

The aluminum source is, for example, an aluminum compound, simple aluminum, or an aluminum alloy. Examples of the aluminum compound include: aluminum-containing oxides, hydroxides, nitrides, oxynitrides, halides (e.g., fluoride and chloride), hydrides, amide compounds, and imide compounds; and compounds that can yield aluminum nitride or the like when heat-treated, and the aluminum source may contain at least one selected from the group consisting of these aluminum compounds. Specific examples of the aluminum compound include aluminum nitride and aluminum fluoride, and the aluminum source may contain at least one selected from the group consisting of these aluminum compounds, and preferably contains at least aluminum nitride. The aluminum source may be used singly, or two or more thereof may be used in combination.

The aluminum source (e.g., aluminum compound) has a purity of, for example, 95% by mass or higher, preferably 99.5% by mass or higher. By controlling the purity to be a prescribed value or higher, the effects of impurities are reduced, so that the emission intensity of the phosphor can be further improved.

In the raw material mixture, aluminum of the aluminum source may be partially substituted with other Group III metal, such as gallium, indium, vanadium, chromium, or cobalt. When the aluminum source contains other Group III metal, the content thereof with respect to aluminum may be, for example, 10% by mole or less, and it is preferably 5% by mole or less. A lower limit of the content is, for example, 1% by mole or more.

The silicon source is, for example, a silicon compound, simple silicon, or a silicon alloy. Examples of the silicon compound include: silicon-containing oxides, nitrides, oxynitrides, halides (e.g., fluoride and chloride), hydrides, amide compounds, and imide compounds; and compounds that can yield silicon nitride or the like when heat-treated, and the silicon source may contain at least one selected from the group consisting of these silicon compounds. Specific examples of the silicon compound include silicon nitride and silicon fluoride, and the silicon source may contain at least one selected from the group consisting of these silicon compounds, and preferably contains at least silicon nitride.

The silicon source may be used singly, or two or more thereof may be used in combination.

The silicon source (e.g., silicon compound) has a purity of, for example, 95% by mass or higher, preferably 99.5% by mass or higher. By controlling the purity to be a prescribed value or higher, the effects of impurities are reduced, so that the emission intensity of the phosphor can be further improved.

In the raw material mixture, silicon of the silicon source may be partially substituted with other Group IV metal, such as germanium, tin, titanium, zirconium, or hafnium. When the silicon source contains other Group IV metal, the content thereof with respect to silicon may be, for example, 10% by mole or less, and it is preferably 5% by mole or less. A lower limit of the content is, for example, 1% by mole or more.

The cerium source is, for example, a cerium compound, simple cerium, or a cerium alloy. Examples of the cerium compound include: oxides, halides (e.g., fluoride and chloride), nitrides, hydrides, amide compounds, and imide compounds; and compounds that can yield cerium nitride or the like when heat-treated, and the cerium source may contain at least one selected from the group consisting of these cerium compounds. Specific examples of the cerium compound include cerium oxide, cerium nitride, cerium fluoride, cerium hydride, and cerium amide, and the cerium source may contain at least one selected from the group consisting of these cerium compounds, and preferably contains at least one selected from the group consisting of cerium oxide, cerium nitride, and cerium fluoride. The cerium source may be used singly, or two or more thereof may be used in combination.

The cerium source may have a purity of, for example, 95% by mass or higher, and the purity is preferably 99.5% by mass or higher. By controlling the purity to be a prescribed value or higher, the effects of impurities are reduced, so that the emission intensity of the phosphor can be further improved.

In the raw material mixture, cerium of the cerium source may be partially substituted with a rare-earth metal, such as europium, scandium, yttrium, lanthanum, praseodymium, neodymium, samarium, gadolinium, terbium, dysprosium, holmium, erbium, thulium, ytterbium, or lutetium. When the cerium source contains other rare-earth metal, the content thereof with respect to cerium may be, for example, 10% by mole or less, and it is preferably 5% by mole or less. A lower limit of the content is, for example, 1% by mole or more.

The raw material mixture may further contain at least one metal fluoride. The metal fluoride is, for example, an alkaline earth metal fluoride or an alkali metal fluoride. The metal fluoride may contain at least an alkaline earth metal, and may further contain Li, Na, K, B, Al or the like in addition to the alkaline earth metal. The alkaline earth metal contained in the alkaline earth metal fluoride is at least one selected from the group consisting of Mg, Ca, Sr, and Ba, and the alkaline earth metal fluoride contains preferably at least Ca, and at least one selected from the group consisting of Mg, Sr, and Ba, more preferably at least one of Ca and Sr. The metal fluoride may double as at least a part of the lithium source, the calcium source, and the strontium source. As for the content of the metal fluoride in the raw material mixture, the molar content ratio of fluorine atom with respect to aluminum may be, for example, 0.02 or higher and 0.3 or lower, and it is preferably 0.02 or higher and lower than 0.3, more preferably 0.02 or higher and 0.27 or less, still more preferably 0.03 or higher and 0.18 or less, yet still more preferably 0.04 or higher and 0.13 or less. By controlling the molar content ratio to be not lower than the above-described lower limit value, an effect of the metal fluoride as a flux can be sufficiently obtained. In addition, by controlling the molar content ratio to be not higher than the above-described upper limit value, an effect of a flux can be obtained without having to incorporate the flux more than necessary.

The metal fluoride has a purity of, for example, 95% by weight or higher, preferably 99% by weight or higher. By controlling the purity to be a prescribed value or higher, the effects of impurities are reduced, so that the emission intensity of the phosphor can be further improved. The metal fluoride may be purchased, or a desired metal fluoride may be produced.

In addition to the metal fluoride, the raw material mixture may further contain a flux of other halide or the like. Examples of the halide include chlorides of rare earths, alkali metals, and the like. When the raw material mixture contains a flux of a halide, the content thereof with respect to the metal fluoride is, for example, 20% by mass or less, preferably 10% by mass or less, more preferably 1% by mass or less.

The raw material mixture used for preparing the first nitride can be prepared by mixing the lithium source, the calcium source, the strontium source, the aluminum source, the silicon source and, as required, the cerium source, at a prescribed amount ratio. In the raw material mixture, a content ratio of the lithium source, the calcium source, the strontium source, the aluminum source, the silicon source, and the cerium source may be selected as appropriate in accordance with the composition of the desired first nitride. In other words, the content ratio of the lithium source, the calcium source, the strontium source, the aluminum source, the silicon source, and the cerium source in the raw material mixture may be substantially the same as that in the composition of the first nitride.

In the method for preparing the first nitride, the molar content ratio of cerium in the raw material mixture can be set in a prescribed range. When the molar content ratio of the cerium source with respect to a total number of moles of the cerium source, the calcium source, and the strontium source in the raw material mixture is defined as cerium ratio, the cerium ratio in the raw material mixture may be, for example, 0.004 or higher and 0.009 or lower, and it is preferably 0.005 or higher, and preferably 0.008 or lower, or lower than 0.007.

The raw material mixture can be obtained by weighing the respective components constituting the raw material mixture such that a desired mixing ratio is obtained, and subsequently mixing the components by, for example, a mixing method using a ball mill or the like, a mixing method using a mixing machine such as a Henschel mixer or a V-type blender, or a mixing method using a mortar and a pestle. The mixing may be dry-mixing, or wet-mixing with an addition of a solvent and the like.

A desired first nitride can be obtained by a heat treatment of the thus obtained raw material mixture. The heat treatment temperature of the raw material mixture is, for example, 1,200° C. or higher, and may be preferably 1,500° C. or higher, 1,800° C. or higher, or 1,900° C. or higher. On the other hand, the heat treatment temperature is, for example, 2,200° C. or lower, and may be preferably 2,150° C. or lower, 2,100° C. or lower, or 2,050° C. or lower. By performing the heat treatment at a temperature of not lower than the above-described lower limit value, cerium is made likely to penetrate into the resulting crystal, so that the desired first nitride is formed efficiently. Meanwhile, when the heat treatment temperature is not higher than the above-described upper limit value, decomposition of the resulting first nitride tends to be inhibited. The heat treatment of the raw material mixture may be performed at a single temperature, or may be performed in multiple steps including two or more heat treatment temperatures.

The atmosphere for the heat treatment of the raw material mixture is preferably a nitrogen gas-containing atmosphere, more preferably substantially a nitrogen gas atmosphere. By performing the heat treatment in a nitrogen gas-containing atmosphere, silicon and the like that may be contained in raw materials can be nitrided as well. In addition, decomposition of the raw materials and the phosphor that are nitrides can be inhibited. When the atmosphere of the heat treatment of the raw material mixture contains nitrogen gas, the atmosphere may also contain hydrogen, a noble gas such as argon, and/or other gas such as carbon dioxide, carbon monoxide, oxygen, or ammonia, in addition to nitrogen gas. In the atmosphere of the heat treatment of the raw material mixture, the content of nitrogen gas is, for example, 90% by volume or higher, preferably 95% by volume or higher. By controlling the content of gases containing elements other than nitrogen to be a prescribed value or less, a reduction in the emission intensity of the nitride phosphor, which is caused by the formation of impurities by such gas components, is inhibited.

The pressure in the heat treatment of the raw material mixture can be set at, for example, normal pressure or higher and 200 MPa or lower. From the standpoint of inhibiting decomposition of the resulting first nitride, a higher pressure is more preferred, and the gauge pressure is preferably 0.1 MPa or higher and 200 MPa or lower, more preferably 0.5 MPa or higher and 20 MPa or lower. A gauge pressure of 0.6 MPa or higher and 1.2 MPa or lower is still more preferred since it imposes few restrictions on an industrial equipment.

The heat treatment of the raw material mixture can be performed using, for example, a gas-pressurized electric furnace. The heat treatment of the raw material mixture can be performed, for example, with the raw material mixture being loaded to a crucible, a boat or the like that is made of a carbon material such as graphite, or a boron nitride (BN) material. Other than a carbon material and a boron nitride material, for example, aluminium oxide (e.g., $Al_2O_3$) or a molybdenum (Mo) material can be used as well. Thereamong, it is preferred to use a crucible or a boat that is made of a boron nitride material.

After the heat treatment of the raw material mixture, the particle size control step of subjecting the first nitride obtained by the heat treatment to a combination of treatments such as crushing, pulverization, washing, and classification, may be incorporated. By the particle size control step, a powder having a desired particle size can be obtained. Specifically, the first nitride can be coarsely pulverized and then further pulverized to a prescribed particle size using a common pulverizer, such as a ball mill, a jet mill, or a vibration mill. The washing may be performed with, for example, deionized water, or a water-containing liquid medium such as an acidic aqueous solution.

Nitride Phosphor

A nitride phosphor may be produced by, for example, the above-described production method, and the nitride phosphor may achieve a high emission intensity corresponding to an excitation energy even when it is excited by a high energy. The nitride phosphor may be a second nitride obtained by the above-described production method.

The nitride phosphor may have a composition that includes aluminum, silicon, nitrogen, cerium, and at least one selected from the group consisting of lithium, calcium, and strontium, and has a cerium molar content of more than 0.006 when an aluminum molar content is 0.6. Further, the nitride phosphor may contain, as a host crystal, a crystal having the same crystal structure as CaAlSiN$_3$, and may have a crystallite size of 70 nm or smaller as determined from an X-ray diffraction pattern.

The crystallite size of the nitride phosphor, which is determined from an X-ray diffraction pattern, may be preferably smaller than 66 nm, or 65 nm or smaller, but preferably 30 nm or larger, or 40 nm or larger. The crystallite size of the nitride phosphor may be determined by a Rietveld analysis of the X-ray diffraction (XRD) pattern of the nitride phosphor. The Rietveld analysis may be performed using, for example, an integrated X-ray powder diffraction analysis software PDXL (manufactured by Rigaku Corporation).

When the crystallite size of the nitride phosphor is in the above-described range, the emission intensity tends to be further improved. Tt is believed that, by heat-treating the first nitride at a prescribed temperature in the above-described heat treatment step, for example, particles of the resulting nitride phosphor are transformed into aggregates of single crystals having a small crystallite size, as a result of which the emission intensity is further improved.

The nitride phosphor may have a peak emission wavelength of, for example, 550 nm or longer, preferably 560 nm or longer, or 570 nm or longer. An upper limit of the peak emission wavelength of the nitride phosphor may be, for example, 620 nm or shorter, preferably 610 nm or shorter, or 600 nm or shorter. A full width at half maximum in the emission spectrum of the nitride phosphor may be, for example, 110 nm or larger, and it is preferably 120 nm or larger, or 125 nm or larger. An upper limit of the full width at half maximum may be, for example, 150 nm or smaller, and it is preferably 140 nm or smaller, or 135 nm or smaller. The nitride phosphor may have a maximum excitation wavelength in a wavelength range of, for example, 320 nm or longer and 500 nm or shorter, preferably 420 nm or longer and 480 nm or shorter.

The internal quantum efficiency of the nitride phosphor may be, for example, 75% or higher, and it is preferably 80% or higher, or 85% or higher. The internal quantum efficiency is measured at room temperature (25° C.) using, for example, a quantum efficiency measurement system (trade name: QE-2100, manufactured by Otsuka Electronics Co., Ltd.).

The nitride phosphor contains, in its composition, aluminum (Al), silicon (Si), nitrogen (N), cerium (Ce), and at least one element selected from the group consisting of lithium (Li), calcium (Ca), and strontium (Sr), and may contain, as a host crystal, a crystal having the same crystal structure as CaAlSiN$_3$. In the composition of the nitride phosphor, when N is 3, a Li content ratio may be, for example, 0 or higher and lower than 1, and it is preferably 0.2 or higher and 0.6 or lower, or 0.3 or higher and 0.5 or lower. In addition, in the composition of the nitride phosphor, when N is 3, a total content ratio of Ca and Sr may be, for example, higher than 0 and 1 or lower, and it is preferably 0.4 or higher and 0.8 or lower, or 0.5 or higher and 0.7 or lower. Further, in the composition of the nitride phosphor, when N is 3, a Si content ratio may be, for example, 1 or higher and 2 or lower, and it is preferably 1.1 or higher and 1.7 or lower, or 1.3 or higher and 1.5 or lower. Still further, in the composition of the nitride phosphor, when N is 3, an Al content ratio may be, for example, 0 or higher and 1 or lower, and it is preferably 0.4 or higher and 0.8 or lower, or 0.5 or higher and 0.7 or lower. Moreover, in the composition of the nitride phosphor, when N is 3, a Ce content ratio may be, for example, 0.001 or higher and 0.1 or lower, and it is preferably 0.002 or higher and 0.02 or lower, or 0.004 or higher and 0.01 or lower.

In the composition of the nitride phosphor, when Al is 0.6, the Li content ratio may be, for example, 0 or higher and lower than 1, and it is preferably 0.2 or higher and 0.6 or lower, 0.25 or higher and 0.5 or lower, or 0.3 or higher and 0.5 or lower. In addition, in the composition of the nitride phosphor, when Al is 0.6, the total content ratio of Ca and Sr may be, for example, higher than 0 and 1 or lower, and it is preferably 0.4 or higher and 0.8 or lower, or 0.5 or higher and 0.7 or lower. Further, in the composition of the nitride phosphor, when Al is 0.6, the Si content ratio may be, for example, 1 or higher and 2 or lower, and it is preferably 1.1 or higher and 1.7 or lower, or 1.3 or higher and 1.5 or lower. Moreover, in the composition of the nitride phosphor, when Al is 0.6, the Ce content ratio may be, for example, higher than 0.006 and 0.1 or lower, and preferably 0.007 or higher, or 0.008 or higher, and preferably 0.02 or lower, 0.015 or lower, or 0.013 or lower.

In the composition of the nitride phosphor, when Al is 1, the Li content ratio may be, for example, 0 or higher and lower than 1.7, and it is preferably 0.33 or higher and 1 or lower, 0.4 or higher and 0.83 or lower, or 0.5 or higher and 0.83 or lower. In addition, in the composition of the nitride phosphor, when Al is 1, the total content ratio of Ca and Sr may be, for example, higher than 0 and 1.7 or lower, and it is preferably 0.67 or higher and 1.3 or lower, or 0.83 or higher and 1.1 or lower. Further, in the composition of the nitride phosphor, when Al is 1, the Si content ratio may be, for example, 1.7 or higher and 3.3 or lower, and it is preferably 1.8 or higher and 3 or lower, or 2.2 or higher and 2.5 or lower. Moreover, in the composition of the nitride phosphor, when Al is 1, the Ce content ratio may be, for example, higher than 0.01 and 0.17 or lower, and preferably 0.012 or higher, or 0.013 or higher, and preferably 0.04 or lower, 0.025 or lower, or 0.02 or lower.

In the composition of the nitride phosphor, when (Al+Si) is 2, the Li content ratio may be, for example, 0 or higher and lower than 1, and it is preferably 0.2 or higher and 0.6 or lower, 0.25 or higher and 0.5 or lower, or 0.3 or higher and 0.5 or lower. In addition, in the composition of the nitride phosphor, when (Al+Si) is 2, the total content ratio of Ca and Sr may be, for example, higher than 0 and 1 or lower, and it is preferably 0.4 or higher and 0.8 or lower, or 0.5 or higher and 0.7 or lower. Further, in the composition of the nitride phosphor, when (Al+Si) is 2, the Ce content ratio may be, for example, higher than 0.006 and 0.1 or lower, and preferably 0.007 or higher, or 0.008 or higher, and preferably 0.02 or lower, 0.015 or lower, or 0.013 or lower.

The nitride phosphor may also be a solid solution comprising or composed of: a third nitride that contains as a host crystal a crystal having the same crystal structure as CaAlSiN$_3$, and Li, Si, N, and Ce; and a fourth nitride that contains as a host crystal a crystal having the same crystal structure as CaAlSiN$_3$, and at least either element of Ca and Sr, Al, Si, N, and Ce. In the composition of the nitride phosphor, Li, Ca, and Sr may be partially substituted with Ce. The third nitride may have a composition represented by, for example, LiSi$_2$N$_3$. Further, the fourth nitride may have a composition represented by (Ca, Sr)AlSiN$_3$. In other words, the nitride phosphor may have a composition represented by the following Formula (2):

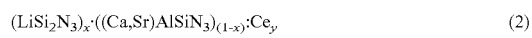

$$(LiSi_2N_3)_x \cdot ((Ca,Sr)AlSiN_3)_{(1-x)}:Ce_y \qquad (2)$$

In Formula (2), x and y satisfy 0≤x<1 and 0<y≤0.1. Preferably, x may be 0.2≤x≤0.5, or 0.3≤x≤0.5, and y may be 0.001≤y≤0.1, 0.002≤y≤0.02, or 0.004≤y≤0.01. Further, y may satisfy 0.006<y≤0.1.

Alternatively, the nitride phosphor may have a composition represented by the following Formula (3):

(Li$_m$Ca$_n$Sr$_r$)Al$_s$Si$_t$N$_u$:Ce$_v$     (3)

In Formula (3), m, n, r, s, t, u, and v may satisfy 0<m<1, 0<n<1, 0≤r<1, 0<s<1, 1<t<2, 2.7≤u≤3.3, and 0.006<v≤0.1. Preferably, m, n, r, s, t, u, and v may satisfy 0.15≤m≤0.5, 0.5≤n≤0.7, 0.05≤r≤0.3, 0.5≤s≤0.61, 1.37≤t≤1.5, 2.9≤u≤3.1, and 0.006<v≤0.03. Further, 0<m+n+r+v≤1, or 0.75≤m+n+r+v≤1 may be satisfied, and 1.9≤s+t≤2.1 may be satisfied as well.

The nitride phosphor is contained in the second nitride obtained by heat-treating the first nitride together with a cerium source; therefore, the atomic fraction (% by atom) of cerium in the composition of the nitride phosphor is higher than the atomic fraction (% by atom) of cerium in the composition of the first nitride. When the first nitride contains cerium, a ratio of the atomic fraction (% by atom) of cerium in the composition of the second nitride with respect to the atomic fraction (% by atom) of cerium in the composition of the first nitride (second nitride/first nitride) may be, for example, 1 or higher and 10 or lower, and it is preferably 1.2 or higher, or 1.5 or higher, and preferably 10 or lower, or 2 or lower.

In the nitride phosphor, the abundance ratio of cerium in the composition may be higher in the vicinity of the surface of a nitride phosphor particle than inside of the particle (e.g., in the vicinity of the center). It is believed that this enables to obtain an emission intensity corresponding to an excitation energy even when the nitride phosphor is excited by a high energy. The term "vicinity of the surface" used herein means a region having a distance of, for example, 1 μm or less from the surface, and the term "vicinity of the center" used herein means a region having a distance of about a half of the diameter of the particle from the surface. The distribution of cerium in the particles of the nitride phosphor can be determined by, for example, an energy dispersive X-ray analysis of particle cross-sections.

The nitride phosphor preferably has a reduced reflectance near the maximum excitation wavelength as compared to the first nitride. This leads to an increase in the absorption of excitation light by the nitride phosphor, so that the emission intensity or the internal quantum efficiency is improved in some cases. For example, at a wavelength of 450 nm, a ratio of the reflectance of the nitride phosphor with respect to the reflectance of the first nitride may be 0.95 or lower, preferably 0.92 or lower, 0.9 or lower, or 0.88 or lower.

With regard to the particle size and the particle size distribution of the nitride phosphor, from the standpoint of the emission intensity, the nitride phosphor may exhibit a single-peak particle size distribution. The volume-average particle size of the nitride phosphor may be, for example, 1 μm or longer and 50 μm or shorter, and it is preferably 10 μm or longer and 40 μm or shorter, or 15 μm or longer and 30 μm or shorter.

Wavelength Conversion Member

A wavelength conversion member includes: a support; and a phosphor layer that is arranged on the support and contains a phosphor. The wavelength conversion member, together with a light emitting element, may constitute a light emitting device. Incorporation of the above-described nitride phosphor as the phosphor allows the wavelength conversion member to exhibit excellent emission characteristics with excellent linearly in that the emission intensity of output light increases in proportion to the output of the light emitting element.

Figure 1B:
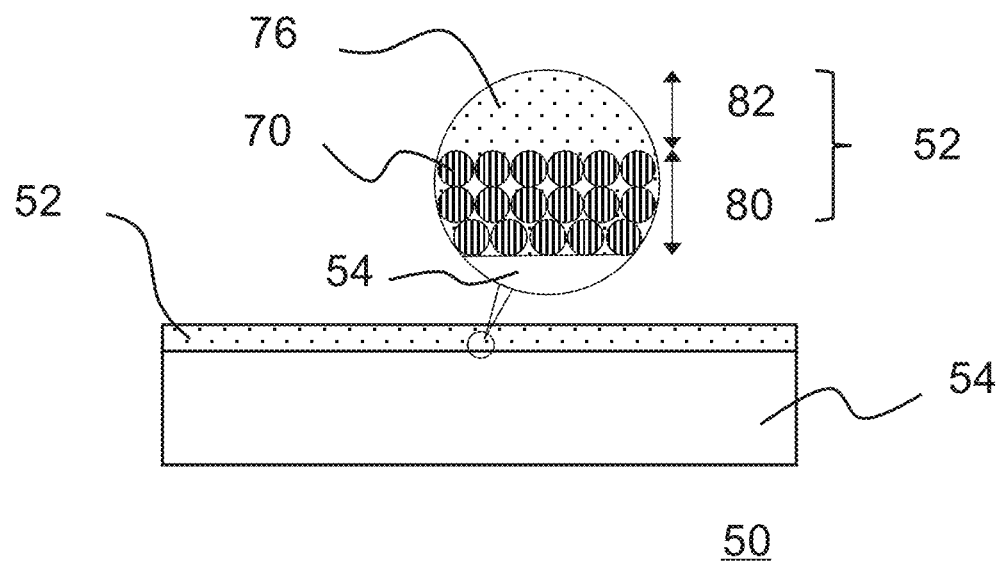
FIG. 1B provides a side view of the exemplary wavelength conversion member taken from a side surface side, and a partially enlarged view thereof.

One example of the wavelength conversion member is schematically illustrated in FIGS. 1A and 1B. FIG. 1A is a schematic plan view of a wavelength conversion member 50 taken from a main surface side. FIG. 1B provides a schematic plan view of the wavelength conversion member 50 taken from a side surface side, and a partially enlarged view thereof. As illustrated in FIG. 1A, a wavelength conversion layer 52 is arranged along the circumference of a disk-shaped support 54. Further, as illustrated in FIG. 1B, a phosphor layer 80 containing a phosphor 70 and a light transmitting layer 82 containing a resin 76 are laminated in this order on one of the main surfaces of the support 54, whereby the wavelength conversion layer 52 is arranged.

Light Emitting Device

A light emitting device includes: a light emitting element; and a wavelength conversion member that contains a phosphor excited by the light emitting element. The light emitting element may have a peak emission wavelength in a wavelength range of, for example, 350 nm to 500 nm, preferably 380 nm to 470 nm, or 400 nm to 460 nm. The use of a light emitting element having a peak emission wavelength in this wavelength range as an excitation light source enables to construct a light emitting device that emits a mixed color light of the light emitted from the light emitting element and the fluorescence emitted from the phosphor. In addition, a portion of the light emitted from the light emitting element can be effectively utilized as a portion of the light emitted from the light emitting device to the outside; therefore, the light emitting device can be provided with a high emission efficiency.

The light emitting element may have an emission spectrum with a full width at half maximum of, for example, 30 nm or smaller. As the light emitting element, it is preferred to use, for example, a semiconductor light emitting element in which a nitride-based semiconductor is used. By using such a semiconductor light emitting element as an excitation light source, a light emitting device that has a high efficiency as well as a high linearity of output with respect to input and is strong and stable against mechanical impact can be obtained. The light emitting element may be a light emitting diode (LED) or a laser diode (LD). The light emitting element may be used singly, or two or more thereof may be used in combination.

The light emitting element may have an output of, for example, 0.5 W/mm$^2$ or more in terms of the power density of light entering the wavelength conversion member, and the output is preferably 5 W/mm$^2$ or more, or 10 W/mm$^2$ or more. An upper limit of the output of the light emitting element may be, for example, 1,000 W/mm$^2$ or less, and it is preferably 500 W/mm$^2$ or less, or 150 W/mm$^2$ or less. When the output of the light emitting element is in the above-described range, the wavelength conversion member has a superior linearity corresponding to the output of the light emitting element.

Figure 2:
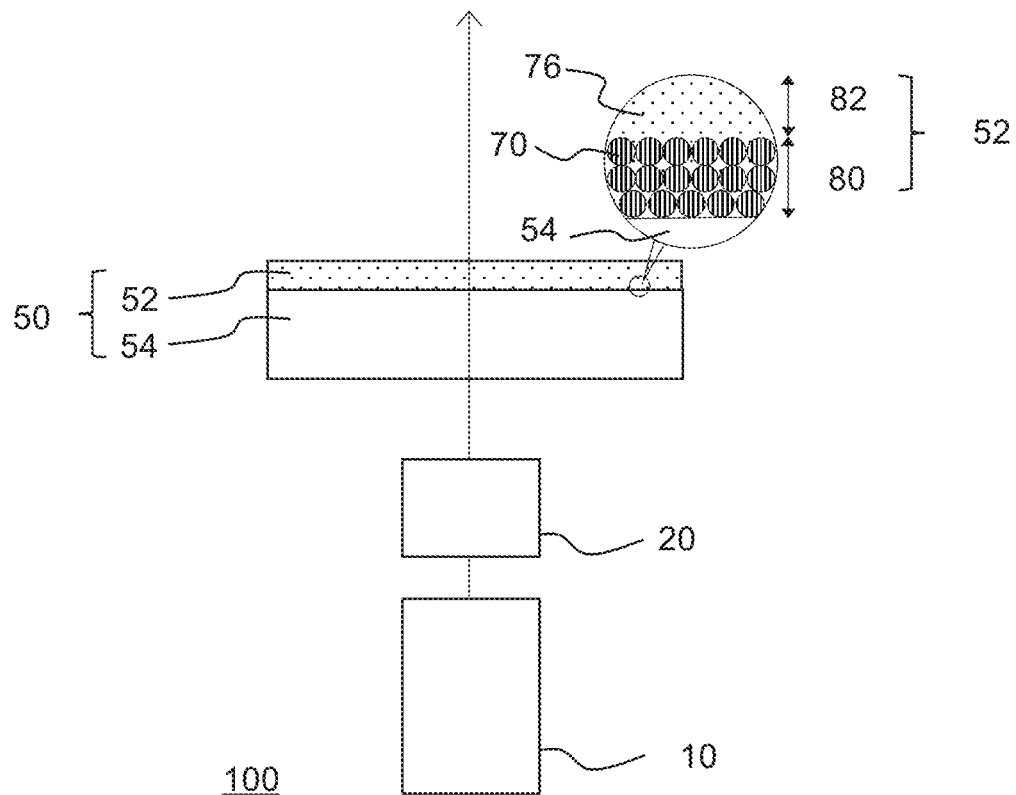
FIG. 2 provides a schematic structural view illustrating an exemplary light emitting device, and a partially enlarged view of an exemplary wavelength conversion member of the light emitting device.

A configuration example of the light emitting device will now be described referring to the drawings. FIG. 2 is a schematic structural view illustrating one example of the configuration of the light emitting device. A light emitting device 100 includes: a light emitting element 10; an incident optical system 20; and a wavelength conversion member 50. The wavelength conversion member 50 includes: a support 54; and a wavelength conversion layer 52 which is arranged on the support 54 and includes a phosphor layer 80 containing a phosphor 70, and a light transmitting layer 82 containing a resin 76. Light emitted from the light emitting element 10 passes through the incident optical system 20, enters the wavelength conversion member 50 from the side of the support 54, and passes through the phosphor layer 80 containing the phosphor 70, and at least a portion of the incident light is wavelength-converted by the phosphor 70. Alternatively, the wavelength-converted light is emitted from the wavelength conversion member 50 together with the remainder of the incident light not wavelength-converted. In this case, the light emitted by the light emitting device 100 is a mixed color light of the light emitted from the light emitting element 10 and the wavelength-converted light.

Figure 3:
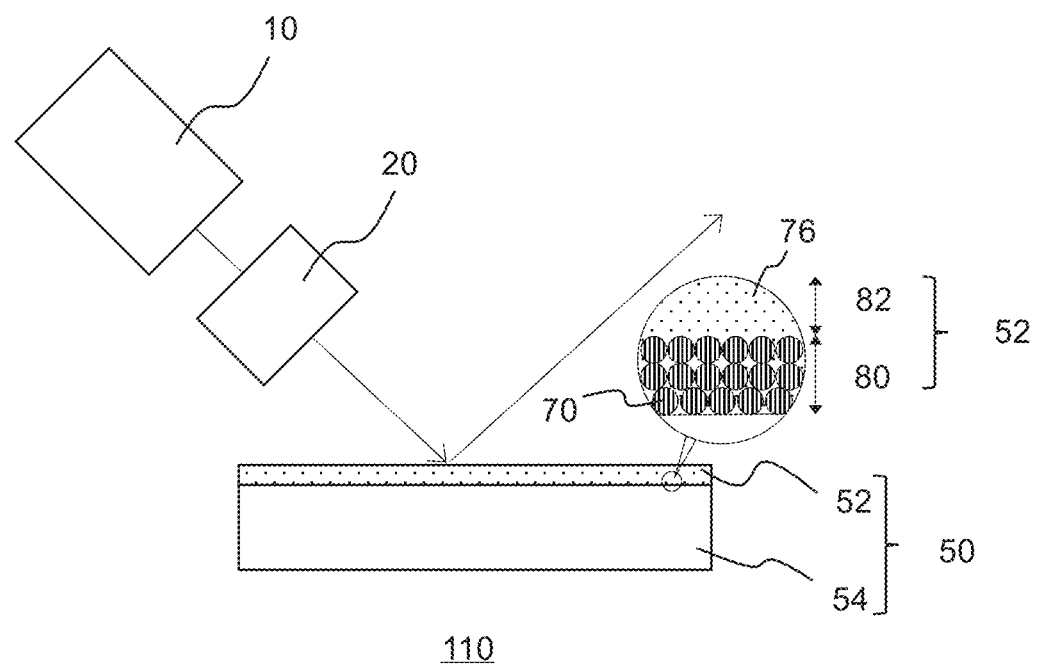
FIG. 3 provides a schematic structural view illustrating another exemplary light emitting device, and a partially enlarged view of an exemplary wavelength conversion member of the light emitting device.

FIG. 3 is a schematic structural view illustrating another exemplary configuration of the light emitting device. A light emitting device 110 includes: a light emitting element 10; an incident optical system 20; and a wavelength conversion member 50. The wavelength conversion member 50 includes: a support 54; and a wavelength conversion layer 52 which is arranged on the support 54 and in which a phosphor layer 80 containing a phosphor 70 and a light transmitting layer 82 containing a resin 76 are laminated in this order. Light emitted from the light emitting element 10 passes through the incident optical system 20, enters the wavelength conversion member 50 from the side of the wavelength conversion layer 52, passes through the wavelength conversion layer 52, and reflected light is emitted from the wavelength conversion layer 52. At least a portion of the light passing through the wavelength conversion layer 52 is wavelength-converted by the phosphor 70. Alternatively, the wavelength-converted light is emitted from the wavelength conversion member 50 together with the remainder of the incident light not wavelength-converted. In this case, the light emitted by the light emitting device 110 is a mixed color light of the light emitted from the light emitting element 10 and the wavelength-converted light.

Light Source Device for Projector

A light source device for a project is configured to include the above-described light emitting device. By incorporating the light emitting device having excellent emission characteristics at a high output, a projector can be configured to have a high output.

The light emitting device including a wavelength conversion member according to the present disclosure can be used not only as a light source device for projectors, but also as a light emitting device incorporated into light sources of, for example, general lighting devices such as ceiling lights; special lighting devices, such as spotlights, stadium lights, and studio lights; lighting devices for vehicles, such as head lumps; projection devices such as head-up displays; endoscope lights; image-capturing devices of digital cameras, mobile phones, smartphones, and the like; and liquid-crystal display devices of personal computer (PC) monitors, laptop personal computers, televisions, personal digital assistants (PDXs), smartphones, tablet PCs, mobile phones, and the like.

EXAMPLES

The present invention will now be described more concretely by way of Examples; however, the present invention is not limited to the below-described Examples.

Example 1

$Ca_3N_2$, $CaF_2$, $LiNH_2$, $Si_3N_4$, AlN, and $CeO_2$ were used as raw material compounds. These raw material compounds were each weighed in a glove box having a nitrogen gas atmosphere such that an element molar ratio Ca:Li:Ce:Si:Al of 0.594:0.400:0.006:1.4:0.6 was achieved as a mixing composition ratio, and subsequently mixed to obtain a raw material mixture. In this process, $Ca_3N_2$ and $CaF_2$ were weighed such that, in the Ca molar ratio of 0.594, 0.576 equivalent to approximately 97% by mole was derived from $Ca_3N_2$ while 0.018 equivalent to approximately 3% by mole was derived from $CaF_2$. The raw material mixture was loaded to a crucible made of a boron nitride (BN) material, and heat-treated in a nitrogen gas atmosphere ($N_2$ gas=100% by volume) at a gauge pressure of 0.92 MPa within a temperature range of 1,800° C. to 2,100° C. The duration of this heat treatment was 3 hours. After the heat treatment, the resultant was allowed to naturally cool to room temperature without any temperature control so as to obtain a heat-treated product. The thus obtained heat-treated product was pulverized, dispersed in deionized water to be washed, and then classified, whereby a first nitride of Example 1 was obtained.

A mixture was obtained by mixing the above-obtained first nitride of Example 1 with 0.5% by mass of $CeO_2$ that was weighed in the atmosphere. This mixture was loaded to a crucible made of a boron nitride (BN) material, and heat-treated in a nitrogen atmosphere ($N_2$ gas=100% by volume) at a gauge pressure of 0.92 MPa and a temperature of 1,500° C. The duration of this heat treatment was 3 hours. After the heat treatment, the resultant was allowed to naturally cool to room temperature without any temperature control, whereby a second nitride was obtained as a heat-treated product. The thus obtained second nitride was pulverized to obtain a nitride phosphor of Example 1.

Example 2

A first nitride of Example 2 was obtained in the same manner as in Example 1. The thus obtained first nitride of Example 2 and the first nitride of Example 1 are different in terms of production lot.

A nitride phosphor of Example 2 was obtained in the same manner as in Example 1, except that the first nitride of Example 2 was used and the heat treatment temperature of the mixture of this first nitride and $CeO_2$ was changed to 1,400° C.

Example 3

A nitride phosphor of Example 3 was obtained in the same manner as in Example 1, except that the first nitride of Example 2 was used and the heat treatment temperature of the mixture of this first nitride and $CeO_2$ was changed to 1,600° C.

Example 4

A nitride phosphor of Example 4 was obtained in the same manner as in Example 1, except that the first nitride of Example 2 was used and the heat treatment temperature of the mixture of this first nitride and $CeO_2$ was changed to 1,800° C.

Example 5

A nitride phosphor of Example 5 was obtained in the same manner as in Example 1, except that the heat treatment temperature of the mixture of the first nitride of Example 1 and $CeO_2$ was changed to 1,600° C.

Example 6

A nitride phosphor of Example 6 was obtained in the same manner as in Example 1, except that 1.0% by mass of $CeO_2$ was weighed with respect to the first nitride of Example 1, and the heat treatment temperature of the mixture of the first nitride and $CeO_2$ was changed to 1,600° C.

Comparative Example 1

A first nitride was obtained in the same manner as in Example 1, except that $Ca_3N_2$, $Li_3N$, $Si_3N_4$, AlN, and $CeO_2$ were used as raw material compounds. The thus obtained first nitride was directly used as a nitride phosphor of Comparative Example 1, without being mixed with $CeO_2$ as in Example 1.

Comparative Example 2

The first nitride of Example 2 was directly used as a nitride phosphor of Comparative Example 2, without being mixed with $CeO_2$ and heat-treated as in Example 1.

Comparative Example 3

The first nitride of Example 1 was directly used as a nitride phosphor of Comparative Example 3, without being mixed with $CeO_2$ and heat-treated as in Example 1.

Comparative Example 4

A first nitride was obtained in the same manner as in Example 1, except that the raw material mixture was obtained such that an element molar ratio Ca:Li:Ce:Si:Al of 0.591:0.400:0.009:1.4:0.6 was achieved as a mixing composition ratio. The thus obtained first nitride was directly used as a nitride phosphor of Comparative Example 4, without being mixed with $CeO_2$ and heat-treated as in Example 1.

Comparative Example 5

A nitride phosphor of Comparative Example 5 was obtained in the same manner as in Example 1, except that the first nitride of Example 1 was not mixed with $CeO_2$, the heat treatment temperature of the mixture of Example 1 was changed to 1,600° C., and only the first nitride was heat-treated.

Evaluation (1) Composition Analysis

For each of the nitride phosphors obtained in Example 1 and Comparative Examples 3 and 4, the composition was analyzed using a scanning X-ray fluorescence spectrometer and an ion chromatography apparatus. The content ratio of each element was determined based on Al=0.6. The results thereof are shown in Table 1. Further, the composition ratios of the respective elements based on Al=1 are shown in Table 2, and the composition ratios of the respective elements based on (Al+Si)=2 are shown in Table 3.

TABLE 1

| | Composition analysis results (based on Al = 0.6) | | | | |
|---|---|---|---|---|---|
| | Li | Ca | Ce | Al | Si |
| Example 1 | 0.310 | 0.596 | 0.0090 | 0.6 | 1.423 |
| Comparative Example 3 | 0.325 | 0.595 | 0.0056 | 0.6 | 1.421 |
| Comparative Example 4 | 0.275 | 0.601 | 0.0083 | 0.6 | 1.393 |

TABLE 2

| | Composition analysis results (based on Al = 1) | | | | |
|---|---|---|---|---|---|
| | Li | Ca | Ce | Al | Si |
| Example 1 | 0.517 | 0.993 | 0.015 | 1.000 | 2.372 |
| Comparative Example 3 | 0.542 | 0.992 | 0.009 | 1.000 | 2.368 |
| Comparative Example 4 | 0.458 | 1.002 | 0.014 | 1.000 | 2.322 |

TABLE 3

| | Composition analysis results (based on Al + Si = 2) | | | | |
|---|---|---|---|---|---|
| | Li | Ca | Ce | Al | Si |
| Example 1 | 0.306 | 0.590 | 0.0089 | 0.593 | 1.407 |
| Comparative Example 3 | 0.322 | 0.589 | 0.0055 | 0.594 | 1.406 |
| Comparative Example 4 | 0.276 | 0.603 | 0.0083 | 0.602 | 1.398 |

As shown in Tables 1 to 3, it is seen that the nitride phosphor obtained in Example had a higher Ce content ratio in its composition than the nitride phosphors obtained in Comparative Examples 3 and 4. This is believed to be an effect of the heat treatment of the mixture in which $CeO_2$ was added to the first nitride that was performed to obtain the nitride phosphor.

(2) Luminous Characteristics

For each of the nitride phosphors obtained above, emission characteristics were measured at room temperature (25° C.) using a quantum efficiency measurement system (trade name: QE-2100, manufactured by Otsuka Electronics Co., Ltd.). The results thereof are shown in Table 4. It is noted here that the relative emission intensity was calculated taking the emission intensity of the nitride phosphor obtained in Comparative Example 1 as 100%. As for the reflectance, the reflectance at a wavelength of 450 nm was measured at room temperature (25° C.) using a spectrofluorometer (trade name: F-4500, manufactured by Hitachi High-Tech Science Corporation). The results thereof are shown in Table 4.

(3) Volume-Average Particle Size

The volume-average particle size was determined by a laser diffraction method using a particle size distribution analyzer.

(4) Crystallite Size

For each of the nitride phosphors obtained above, an X-ray diffraction pattern was obtained using a sample horizontal-type multi-purpose X-ray diffractometer (product name: ULTIMA IV, manufactured by Rigaku Corporation, X-ray source: CuKα radiation (λ=1.5418 Å)). The crystallite size was determined by a Rietveld analysis of the thus obtained X-ray diffraction pattern using an analysis software PDXL (manufactured by Rigaku Corporation). The results thereof are shown in Table 4. Table 4 also shows the Ce content ratio, taking the content of Al in the respective compositions as 1.

(5) Observation Under Scanning Electron Microscope

Figure 6:
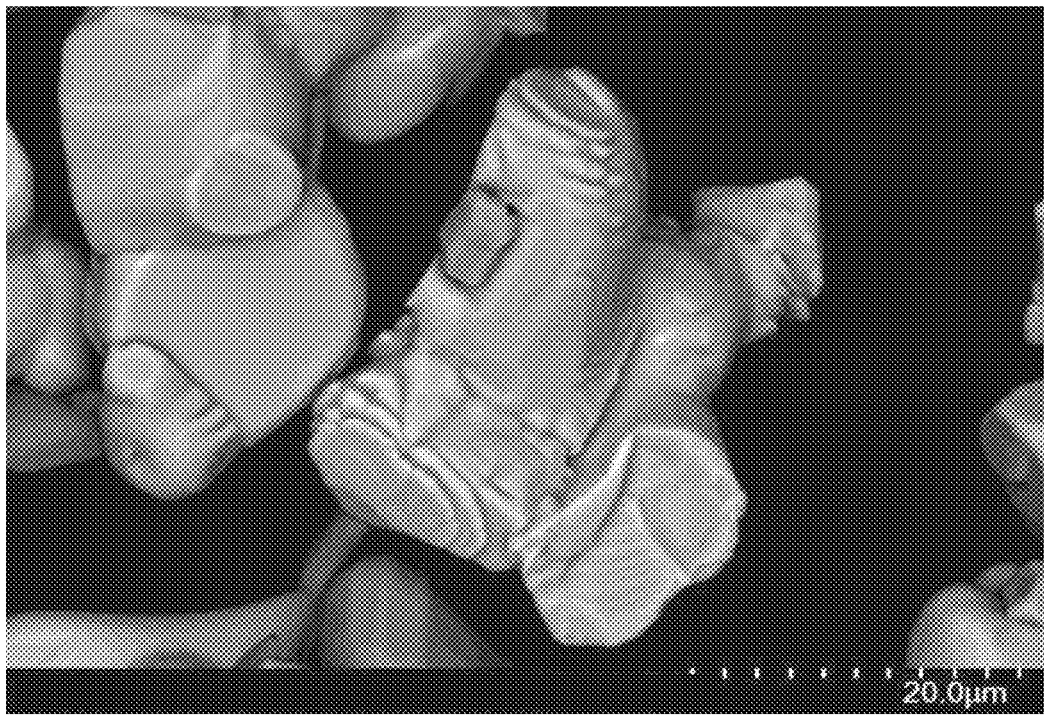
FIG. 6 is an exemplary scanning electron micrograph of the nitride phosphor according to Comparative Example 1.
Figure 7:
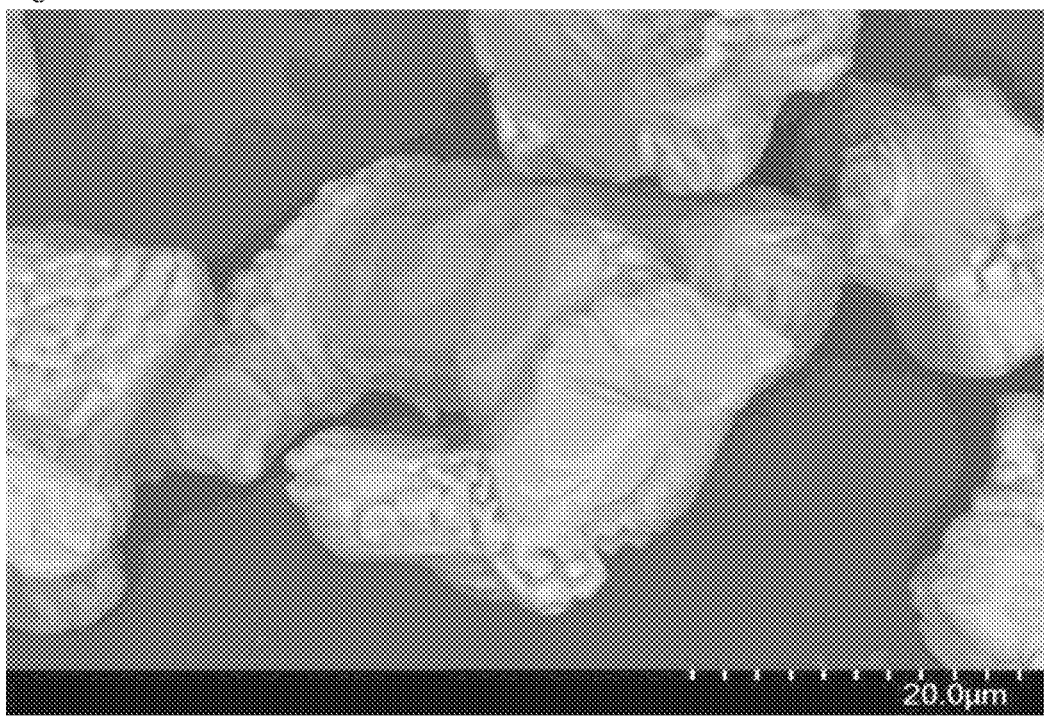
FIG. 7 is an exemplary scanning electron micrograph of the nitride phosphor according to Example 1.
Figure 8:
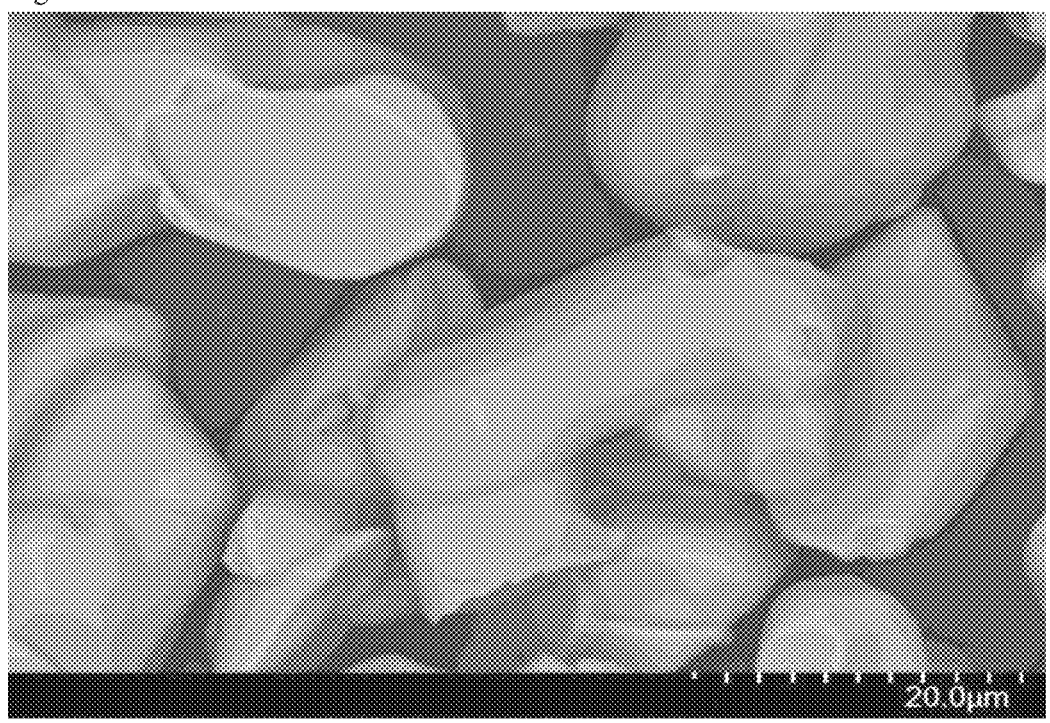
FIG. 8 is an exemplary scanning electron micrograph of the nitride phosphor according to Comparative Example 4.

For each of the nitride phosphors obtained in Comparative Example 1, Example 1, and Comparative Example 4, a scanning electron micrograph (SEM) was obtained using a field-emission scanning electron microscope (product name: SU8230, manufactured by Hitachi High-Technologies Corporation). The thus obtained SEM images of Comparative Example 1, Example 1, and Comparative Example 4 are shown in FIGS. 6, 7 and 8, respectively.

phosphor of Comparative Example 4 shown in FIG. 8, the nitride phosphor of Example 1 shown in FIG. 7 had a greater amount of particle surface irregularities. This is believed to be because, as a result of, for example, heat-treating the mixture, which was obtained by adding $CeO_2$ to the first nitride, at a temperature lower than the heat treatment temperature of the first nitride, particles were transformed into aggregates of single crystals having a small crystallite size.

(5) Evaluation of Wavelength Conversion Members

Wavelength conversion members were produced in the following manner using the nitride phosphors obtained in Example 1 and Comparative Examples 1 to 3, and the

TABLE 4

| | Luminous characteristics | | | | Volume-average particle size Dm (μm) | Crystaline size (nm) | Ce mixing composition ratio (Al = 1) |
|---|---|---|---|---|---|---|---|
| | Peak emission wavelength (nm) | Relative emission intensity (%) | Internal quantum efficiency (%) | Reflectance at 450 nm (%) | | | |
| Example 1 | 585 | 107.6 | 88 | 20.1 | 27.8 | 61.4 | 0.015 |
| Example 2 | 581 | 107.1 | 87 | 23.4 | — | 63.5 | 0.015 |
| Example 3 | 586 | 113.1 | 95 | 23.4 | — | 64.6 | 0.015 |
| Example 4 | 585 | 105.7 | 90 | 28.8 | — | 40.3 | 0.015 |
| Example 5 | 584 | 105.8 | 87 | 20.4 | — | 54.0 | 0.015 |
| Example 6 | 582 | 105.1 | 84 | 19.9 | — | 54.9 | 0.020 |
| Comparative Example 1 | 583 | 100 | 82 | 29.5 | 18.1 | 66.0 | 0.010 |
| Comparative Example 2 | 582 | 105.1 | 85 | 26.0 | 21.6 | — | — |
| Comparative Example 3 | 583 | 108.1 | 90 | 23.1 | 27.6 | — | — |
| Comparative Example 4 | 585 | 99.9 | 76 | 20.0 | 25.3 | 77.8 | 0.015 |
| Comparative Example 5 | 579 | 103.3 | 86 | 25.2 | — | 46.9 | 0.010 |

As shown in Table 4, it is seen that the nitride phosphors of Examples 1 to 6 had a higher emission intensity and/or a higher internal quantum efficiency than the nitride phosphors of Comparative Examples 1, 4, and 5. In addition, it is seen that, as compared to the nitride phosphor of Comparative Example 1, the nitride phosphors of Examples 1 to 6 had a lower reflectance of light having a wavelength of 450 nm and thus absorb a greater amount of light having a wavelength of 450 nm. Moreover, it is seen that the nitride phosphors of Examples 1, 5 and 6 had a higher emission intensity and a higher internal quantum efficiency than the nitride phosphor of Comparative Example 4 that exhibited a comparative reflectance of about 20%.

As shown in Table 4, it is seen that the nitride phosphor of Comparative Example 4 had a larger crystallite size than the nitride phosphor of Comparative Example 1. This suggests that the crystallite size tends to be increased as the cerium content increases. On the other hand, it is seen that the nitride phosphors of Example 1 to 6, despite having a cerium content equivalent to or higher than that of the nitride phosphor of Comparative Example 4, had a smaller crystallite size than the nitride phosphor of Comparative Example 1. This indicates that, by heat-treating the first nitride together with a cerium source at a prescribed temperature as described above, the physical properties were controlled such that the crystallite size was reduced while increasing the cerium content in the respective nitride phosphors.

It is seen that, as compared to the nitride phosphor of Comparative Example 1 shown in FIG. 6 and the nitride emission intensity was evaluated for each of the thus produced wavelength conversion members. A phosphor paste was prepared by mixing 100 parts by mass of a silicone resin as a binder with 100 parts by mass of each nitride phosphor. As a support, a plate-form metal member, which was made of aluminum and had a disk shape in a plan view taken from the side of a main surface, was used. On one of the main surfaces of this support, the phosphor paste was arranged in an annular shape at a prescribed width along the circumference of the metal member by a printing method to form a wavelength conversion layer, whereby each wavelength conversion member was produced. The phosphor layer thickness is shown below for each of the thus obtained wavelength conversion members.

TABLE 5

| Nitride phosphor | Phophor layer (μm) |
|---|---|
| Example 1 | 121 |
| Comparative Example 1 | 121 |
| Comparative Example 2 | 118 |
| Comparative Example 3 | 118 |

Figure 4:
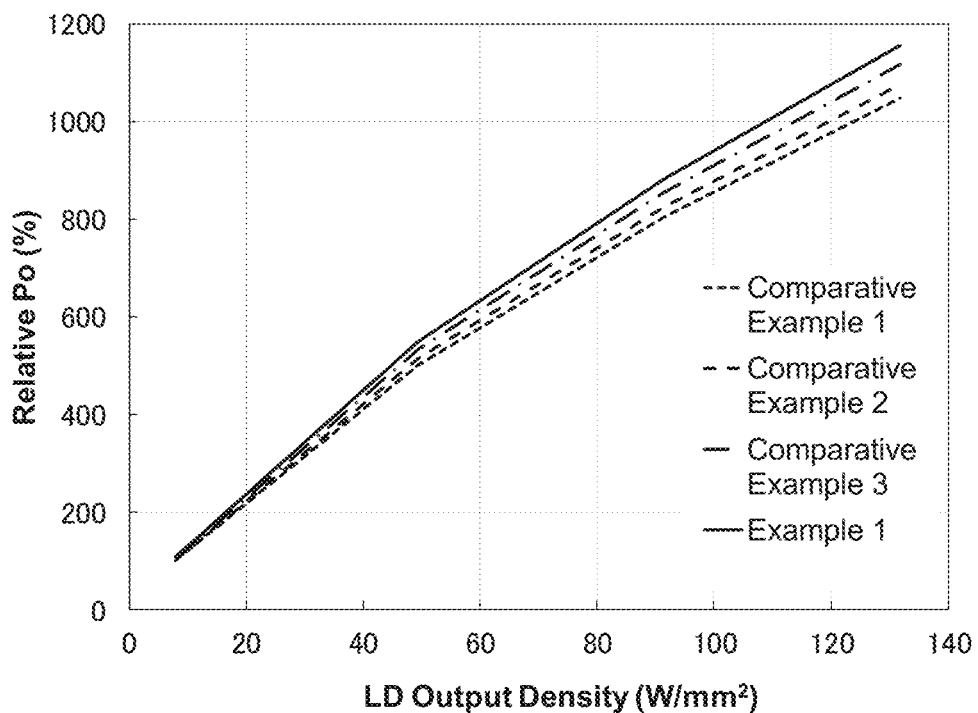
FIG. 4 is a graph showing changes in the emission intensity of light emitted from wavelength conversion members with respect to the output density of an excitation light source in Comparative Examples 1 to 3 and Example 1.
Figure 5:
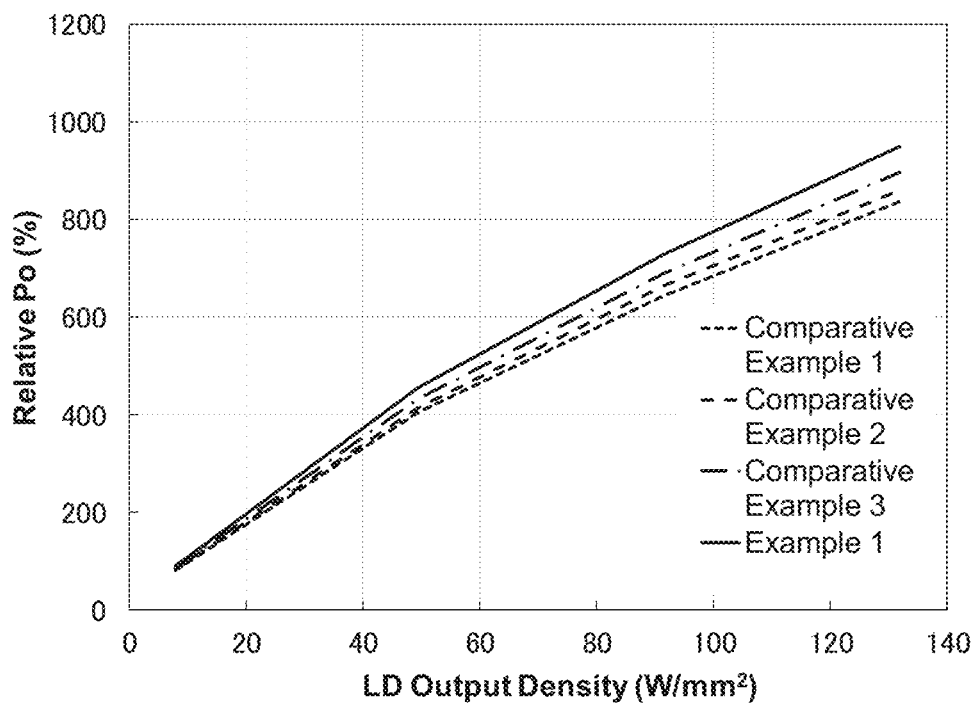
FIG. 5 is a graph showing changes in the emission intensity of light emitted from wavelength conversion members in a range of 550 nm to 800 nm with respect to the output density of an excitation light source in Comparative Examples 1 to 3 and Example 1.

For each wavelength conversion member, the emission intensity was measured as follows. The disk-shaped wavelength conversion member was immobilized on a driver, and emission characteristics were measured while rotating the driver at a rotation speed of 7,200 rpm. A laser diode (LD)

having a peak emission wavelength of 455 nm was prepared as an excitation light source of the wavelength conversion member, the output density (W/mm$^2$) of the laser diode was changed in a stepwise manner as shown in Table 6 below, and the emission intensity of light emitted from the wavelength conversion member at each output density was measured in a wavelength range of 470 nm to 800 nm. This measurement of the emission intensity was performed using a Si photodiode manufactured by Hamamatsu Photonics K.K., and the results thereof are shown in Table 6 and FIG. 4 in terms of the relative emission intensity (relative Po %) based on the emission intensity (100%) measured when the output density of the laser diode in the wavelength conversion member using the nitride phosphor obtained in Comparative Example 1 was 8 W/mm$^2$. Further, Table 7 and FIG. 5 show the relative emission intensity (relative Po %) in a wavelength range of 550 nm to 800 nm (e.g., wavelength range including red color components).

TABLE 6

| Nitride phosphor | LD output density (W/mm$^2$) | | | |
| --- | --- | --- | --- | --- |
| | 8 | 49 | 92 | 132 |
| Example 1 | 107.2 | 548.3 | 883.7 | 1155.7 |
| Comparative Example 1 | 100 | 501.6 | 804.0 | 1049.0 |
| Comparative Example 2 | 101.3 | 514.0 | 825.9 | 1074.8 |
| Comparative Example 3 | 104.4 | 532.9 | 855.8 | 1116.0 |

TABLE 7

| Nitride phosphor | LD output density (W/mm$^2$) | | | |
| --- | --- | --- | --- | --- |
| | 8 | 49 | 92 | 132 |
| Example 1 | 89.2 | 454.4 | 729.1 | 949.7 |
| Comparative Example 1 | 80.7 | 403.5 | 643.6 | 836.1 |
| Comparative Example 2 | 81.8 | 414.2 | 663.0 | 859.0 |
| Comparative Example 3 | 84.7 | 430.9 | 689.6 | 895.6 |

As shown in Tables 6 and 7, it is seen that, when the output density of the laser diode used as an excitation light source was changed, the wavelength conversion member using the nitride phosphor of Example 1 had a higher emission intensity than the wavelength conversion members using any of the nitride phosphors of Comparative Examples 1 to 3. A nitride phosphor obtained by the method for producing a nitride phosphor according to the present disclosure exhibits a sufficient emission intensity even when excited by a high energy. Particularly, such a nitride phosphor has a higher emission intensity in a wavelength range that includes red color components.

A wavelength conversion member or a light emitting device that utilizes the nitride phosphor of the present disclosure can be used as a wavelength conversion member or a light emitting device that is incorporated into light sources of, for example, general lighting devices such as ceiling lights; special lighting devices, such as spotlights, stadium lights, and studio lights; lighting devices for vehicles, such as head lumps; projection devices such as head-up displays; endoscope lights; image-capturing devices of digital cameras, mobile phones, smartphones, and the like; and liquid-crystal display devices of personal computer (PC) monitors, laptop personal computers, televisions, personal digital assistants (PDXs), smartphones, tablet PCs, mobile phones, and the like.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing a nitride phosphor, the method comprising:
preparing a mixture that comprises a first nitride and a cerium source, the first nitride comprising, as a host crystal, a crystal having the same crystal structure as CaAlSiN$_3$; and
performing a heat treatment of the mixture at a temperature of 1,300° C. to 1,900° C. to obtain a second nitride,
wherein the first nitride comprises aluminum, silicon, nitrogen, lithium, and at least one selected from the group consisting of calcium and strontium.

2. The method for producing a nitride phosphor according to claim 1, wherein, in the mixture, a content of the cerium source with respect to the first nitride is 0.1% by mass to 10% by mass.

3. The method for producing a nitride phosphor according to claim 1, wherein, in the mixture, the cerium source comprises at least one selected from the group consisting of cerium oxide, cerium nitride, and cerium fluoride.

4. The method for producing a nitride phosphor according to claim 1, wherein the heat treatment is performed in a nitrogen gas-containing atmosphere under a pressure of 0.1 MPa to 200 MPa.

5. The method for producing a nitride phosphor according to claim 1, wherein the first nitride contained in the mixture is prepared by heat-treating a raw material mixture that comprises a lithium source, and at least one selected from the group consisting of a calcium source and a strontium source, and an aluminum source and a silicon source, in a nitrogen gas-containing atmosphere at a temperature of 1,200° C. to 2,000° C.

6. The method for producing a nitride phosphor according to claim 5, wherein the lithium source comprises at least one selected from the group consisting of lithium amide and lithium nitride.

7. The method for producing a nitride phosphor according to claim 5, wherein the calcium source comprises at least one selected from the group consisting of calcium nitride and calcium fluoride.

8. The method for producing a nitride phosphor according to claim 1, wherein an atomic fraction of cerium in a composition of the second nitride is higher than an atomic fraction of cerium in a composition of the first nitride contained in the mixture.

9. The method for producing a nitride phosphor according to claim 1, wherein the second nitride has a composition represented by the following formula:

$$(LiSi_2N_3)_x \cdot ((Ca,Sr)AlSiN_3)_{(1-x)}:Ce_y$$

wherein, x and y satisfy 0≤x<1 and 0<y≤0.1.

10. The method for producing a nitride phosphor according to claim 1, wherein the first nitride further comprises cerium.

11. The method for producing a nitride phosphor according to claim 1, wherein in a composition of the first nitride, when a molar content of N is 3, a Li molar content ratio is 0.2 or higher and 0.6 or lower, and a total molar content ratio of Ca and Sr is 0.4 or higher and 0.8 or lower.

12. The method for producing a nitride phosphor according to claim 1, wherein the first nitride has a composition represented by the following formula (1):

$$(LiSi_2N_3)_p \cdot ((Ca,Sr)AlSiN_3)_{(1-p)}:Ce_q \qquad (1)$$

In formula (1), p and q satisfy 0.2≤p≤0.6 and 0<q≤0.1.

* * * * *